(12) United States Patent
Dickson (10) Patent No.: US 8,769,299 B1
(45) Date of Patent: Jul. 1, 2014

(54) LICENSE UTILIZATION MANAGEMENT SYSTEM LICENSE WRAPPER

(75) Inventor: Richard Jesse Dickson, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 466 days.

(21) Appl. No.: 12/903,580

(22) Filed: Oct. 13, 2010

(51) Int. Cl.
*H04L 9/00* (2006.01)

(52) U.S. Cl.
USPC ............... 713/189; 705/59; 705/75

(58) Field of Classification Search
USPC ...................... 713/189; 705/59, 75
See application file for complete search history.

(56) References Cited

U.S. PATENT DOCUMENTS

| | | | |
|---|---|---|---|
| 5,224,095 A | 6/1993 | Woest et al. | |
| 5,237,568 A | 8/1993 | Woest et al. | |
| 5,243,595 A | 9/1993 | Woest et al. | |
| 5,249,184 A | 9/1993 | Woest et al. | |
| 5,553,143 A | 9/1996 | Ross et al. | |
| 5,650,998 A | 7/1997 | Angenot et al. | |
| 5,675,629 A | 10/1997 | Raffel et al. | |
| 5,754,765 A | 5/1998 | Danneels et al. | |
| 5,911,120 A | 6/1999 | Jarett et al. | |
| 6,044,154 A | 3/2000 | Kelly | |
| 6,269,080 B1 | 7/2001 | Kumar | |
| 6,336,201 B1 | 1/2002 | Geile et al. | |
| 6,430,275 B1 | 8/2002 | Voit et al. | |
| 6,611,692 B2 | 8/2003 | Raffel et al. | |
| 6,779,138 B2 | 8/2004 | Nagaura et al. | |
| 7,058,606 B2 | 6/2006 | Stefik et al. | |
| 7,228,330 B2 | 6/2007 | Vignaud | |
| 7,360,079 B2 | 4/2008 | Wall | |
| 7,428,004 B2 | 9/2008 | Creamer et al. | |
| 7,617,328 B2 | 11/2009 | Lewis et al. | |
| 7,715,833 B2 | 5/2010 | Sanchez | |
| 7,716,348 B1 * | 5/2010 | Redding et al. | ............... 709/229 |
| 7,725,723 B2 | 5/2010 | Landrock et al. | |
| 7,739,658 B2 | 6/2010 | Watson et al. | |
| 7,793,334 B2 | 9/2010 | Lewis | |
| 7,865,719 B2 | 1/2011 | Muller et al. | |
| 7,911,946 B2 | 3/2011 | Poli et al. | |
| 7,974,726 B2 | 7/2011 | Rothe et al. | |
| 8,073,939 B2 | 12/2011 | Yamamoto et al. | |
| 8,112,787 B2 | 2/2012 | Buer | |
| 8,189,786 B2 | 5/2012 | Hauge et al. | |
| 8,190,131 B2 | 5/2012 | Lewis | |
| 2002/0032874 A1 | 3/2002 | Hagen | |
| 2002/0199001 A1 | 12/2002 | Wenocur et al. | |

(Continued)

OTHER PUBLICATIONS

"Flexera Software Enterprise License Optimization", 1 page retrieved Jul. 28, 2010—www.flexerasoftware.com.

(Continued)

*Primary Examiner* — Brandon Hoffman
*Assistant Examiner* — Samuel Ambaye
(74) *Attorney, Agent, or Firm* — Yee & Associates, P.C.

(57) ABSTRACT

The different advantageous embodiments provide a system for managing license usage comprising a license management interface and a number of storage devices. The license management interface is configured to control access to a number of applications. The number of applications is associated with a number of licenses. The number of storage devices has a number of files needed to run the number of applications. The number of storage devices is configured to be managed by the license management interface to distribute the number of files to a number of client systems approved to run the number of applications.

14 Claims, 7 Drawing Sheets

(56) References Cited

U.S. PATENT DOCUMENTS

| | | |
|---|---|---|
| 2003/0072451 A1 | 4/2003 | Pimentel et al. |
| 2003/0233461 A1 | 12/2003 | Mariblanca-Nieves et al. |
| 2005/0021957 A1 | 1/2005 | Gu |
| 2005/0154889 A1 | 7/2005 | Ashley et al. |
| 2005/0283388 A1 | 12/2005 | Eberwine et al. |
| 2006/0287959 A1* | 12/2006 | Blecken .......... 705/59 |
| 2007/0168266 A1 | 7/2007 | Questembert |
| 2007/0299845 A1* | 12/2007 | Tokunaga .......... 707/9 |
| 2008/0071689 A1* | 3/2008 | Tabet .......... 705/59 |
| 2009/0007220 A1 | 1/2009 | Ormazabal et al. |
| 2009/0165099 A1 | 6/2009 | Eldar et al. |
| 2009/0292809 A1 | 11/2009 | Park et al. |
| 2011/0134836 A1 | 6/2011 | Lin et al. |
| 2011/0205949 A1 | 8/2011 | Maenpaa et al. |
| 2011/0296171 A1 | 12/2011 | Fu et al. |
| 2011/0296172 A1 | 12/2011 | Fu et al. |
| 2011/0296175 A1 | 12/2011 | Shin |

OTHER PUBLICATIONS

"Open it, Inc.", pp. 1-2, retrieved Jul. 28, 2010 www.openitcom.
U.S. Appl. No. 12/903,612, filed Oct. 13, 2010, Dickson.
USPTO Office Action dated Feb. 10, 2012 regarding U.S. Appl. No. 12/903,612, 16 pages.

\* cited by examiner

LICENSE UTILIZATION MANAGEMENT SYSTEM LICENSE WRAPPER

CROSS REFERENCE TO RELATED APPLICATIONS

This application is related to commonly assigned and U.S. patent application Ser. No. 12/903,612 entitled "License Utilization Management System Service Suite" which is hereby incorporated by reference.

BACKGROUND INFORMATION

1. Field

The present disclosure relates generally to a management system for data processing systems and more particularly to a management system license wrapper for license utilization with data processing systems.

2. Background

Software applications typically require a user to possess a software license to use the given application. A software license is a contract governing the usage or redistribution of software. These software licenses are associated with an agreement of use that restricts the user to a certain type of use for the given application.

With proprietary software, a software license generally grants the holder to use one or more copies of the software application. The ownership of the software remains with the software publisher, and only use of the software according to the terms of the license is permitted by an end-user.

Software licenses can be costly, limiting the number of licenses for a particular type of software application that a given business or company may be able to afford. As such, software applications are often limited to a certain number of users or certain number of systems in keeping with the number of licenses purchased by the end-user from the software publisher.

Therefore, it would be advantageous to have a method and apparatus that addresses one or more of the issues discussed above.

SUMMARY

The different advantageous embodiments provide a system for managing license usage comprising a license management interface and a number of storage devices. The license management interface is configured to control access to a number of applications. The number of applications is associated with a number of licenses. The number of storage devices has a number of files needed to run the number of applications. The number of storage devices is configured to be managed by the license management interface to distribute the number of files to a number of client systems approved to run the number of applications.

The different advantageous embodiments further provide a method for allocating license usage. A license wrapper request for an application is received from a client. A license wrapper script is run. A license wrapper activity file is opened for the application requested. A timestamp is generated and the license wrapper request is processed for the application.

The different advantageous embodiments further provide a method for processing a license request. A license associated with an application identified in a request to run the application from a client is checked out. An application activity file is closed. Application files are pushed to the client. The application files are files needed by the client to run the application. The application is run on the client.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
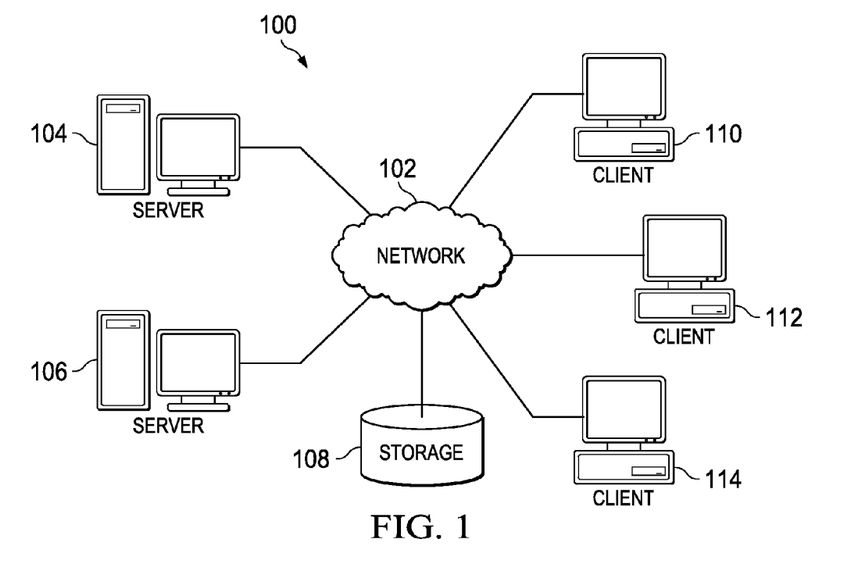
FIG. 1 is an illustration of a network of data processing systems in which an advantageous embodiment may be implemented.
Figure 2:
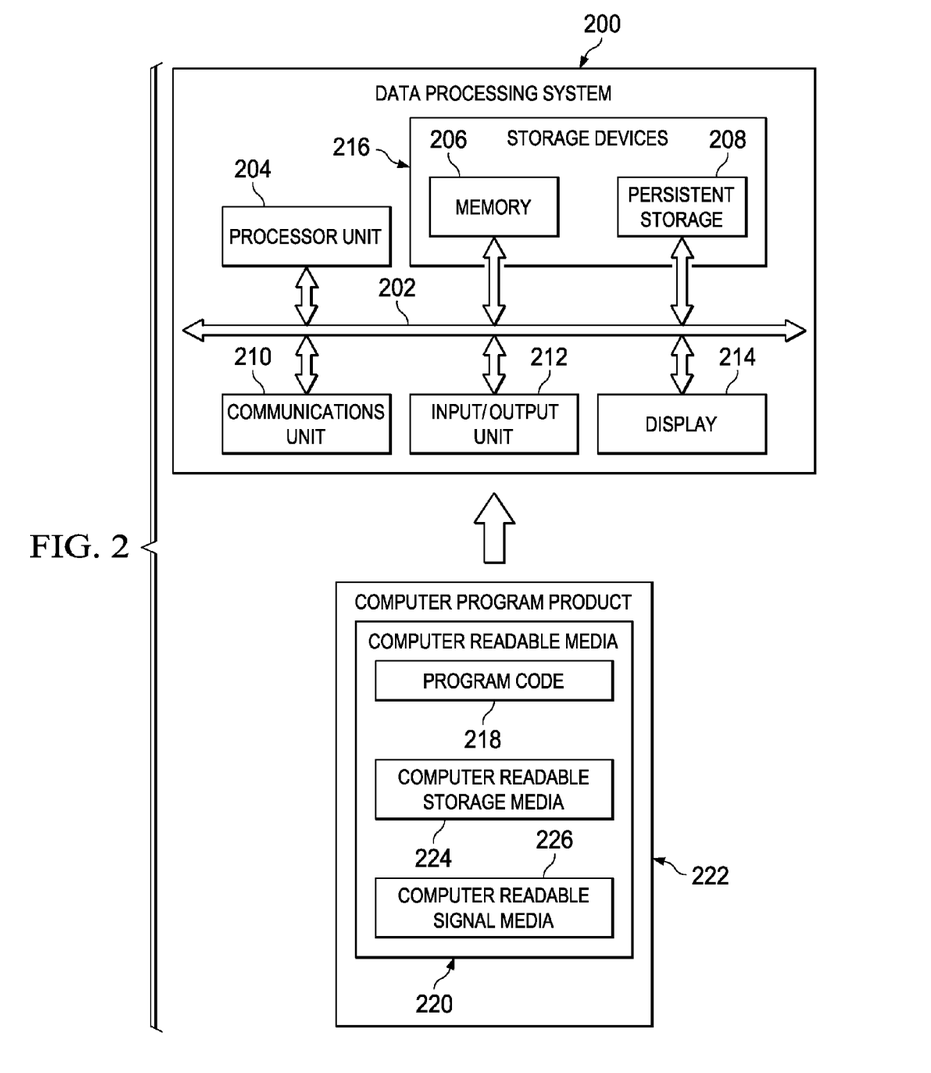
FIG. 2 is an illustration of a data processing system in accordance with an advantageous embodiment.

With reference now to the figures and in particular with reference to FIGS. 1-2, diagrams of data processing environments are provided in which the advantageous embodiments of the present invention may be implemented. It should be appreciated that FIGS. 1-2 are only illustrative and are not intended to assert or imply any limitation with regard to the environments in which different embodiments may be implemented. Many modifications to the depicted environments may be made.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environment may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account that current software license are costly and often limit the number of licenses a company or business can afford to buy for a particular application. Additionally, the allocation of the licenses to users within a company often makes inefficient use of the limited number of licenses a company purchases.

The different advantageous embodiments further recognize and take into account that a given license will have a license agreement stipulating the terms of use in one or more areas, such as the number of systems that can use the license at a given time, the number of users that can use the license at a given time, or the number of jobs that can run using the license at a given time. With varying agreements for each license, often a larger number of licenses than needed is purchased in order to cover the different user groups or systems that may need access to the license at different times.

Thus, the different advantageous embodiments provide a system for managing license usage comprising a license management interface and a number of storage devices. The license management interface is configured to control access to a number of applications. The number of applications is associated with a number of licenses. The number of storage devices has a number of files needed to run the number of applications. The number of storage devices is configured to be managed by the license management interface to distribute the number of files to a number of client systems approved to run the number of applications.

The different advantageous embodiments further provide a method for allocating license usage. A license wrapper request for an application is received from a client. A license wrapper script is run. A license wrapper activity file is opened for the application requested. A timestamp is generated and the license wrapper request is processed for the application.

The different advantageous embodiments further provide a method for processing a license request. A license associated with an application identified in a request to run the application from a client is checked out. An application activity file is closed. Application files are pushed to the client. The application files are files needed by the client to run the application. The application is run on the client.

Figure 3:
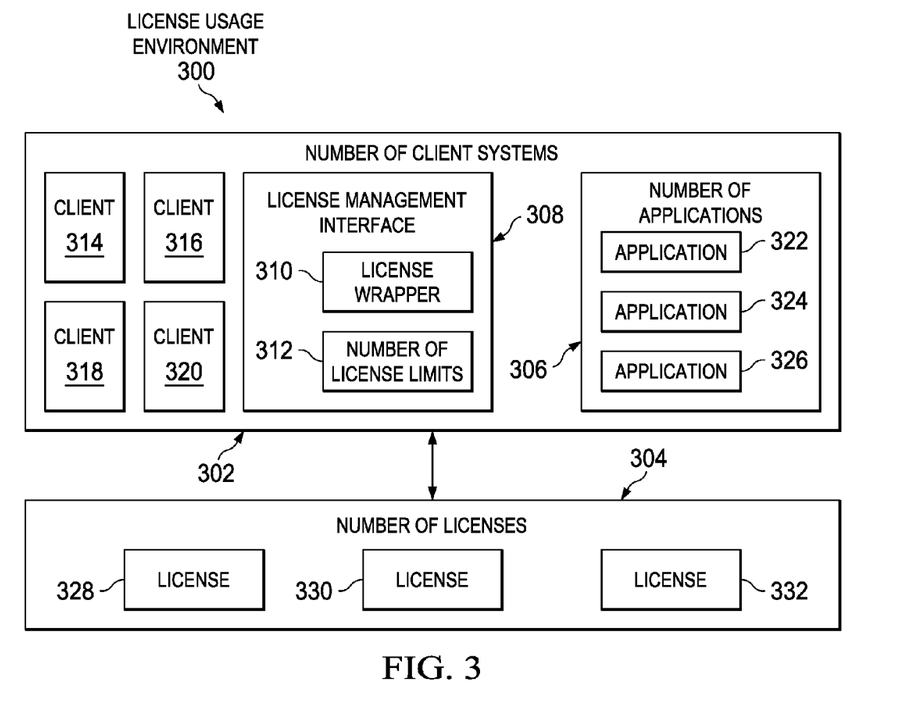
FIG. 3 is an illustration of a license usage environment in accordance with an advantageous embodiment.

With reference now to FIG. 3, an illustration of a license usage environment is depicted in accordance with an advantageous embodiment. License usage environment 300 may be implemented in a network environment, such as network data processing system 100 in FIG. 1, for example.

License usage environment 300 includes number of client systems 302 and number of licenses 304. Number of client systems 302 may be an illustrative example of one implementation of client 110, client 112, and/or client 114 in FIG. 1, for example. Number of client systems 302 may be implemented using data processing system 200 in FIG. 2, in one illustrative example. Number of client systems 302 includes number of applications 306. Number of applications 306 may be any type of program or software designed to help a user perform one or more tasks using a computing system, such as number of client systems 302, for example.

Each application in number of applications 306 is associated with a license from number of licenses 304. Number of licenses 304 may be one or more software licenses, in this illustrative example. A software license is a legal instrument that governs the usage or redistribution of software, such as number of applications 306. Number of licenses 304 may include a specific license for each application in number of applications 306, for example.

Number of client systems 302 includes license management interface 308. License management interface 308 is a license utilization management program that controls access to applications, such as number of applications 306, based on a number of licenses, such as number of licenses 304. License management interface 308 includes license wrapper 310 and number of license limits 312. License wrapper 310 is a script which provides license management interface 308 the ability to control the access by number of client systems 302 to number of applications 306. Number of license limits 312 is a number of use constraints placed on number of applications 306 based on number of licenses 304 and enforced by license wrapper 310. Number of license limits 312 may include, without limitation, concurrent job count limits, number of node limits, number of user limits, node list limits, and user list limits. Concurrent job count limits refers to a restriction as to the number of jobs which an application may concurrently perform at any given point in time, for example. Number of node limits refers to a restriction as to the number of nodes on which an application may run at any given point in time. Number of user limits refers to a restriction on the number of users that may run an application at any given point in time. Node list limits refers to a restriction on the specific nodes which may run an application. User list limits refers to a restriction on the specific user accounts which may run an application.

If a client system in number of client systems 302 attempts to check out a license on an application in number of applications 306, all of the criteria for all of the number of license limits 312 imposed upon the requested application must be met in order to receive a successful license checkout. Client 314, client 316, client 318, and client 320 are an illustrative example of one implementation of number of client systems 302. Client 314, client 316, client 318, and client 320 may be different nodes in a computing environment, for example, such as network environment 100 in FIG. 1. Number of applications 306 may run on one or more of client 314, client 316, client 318, and client 320 based on licensing agreements of number of licenses 304 associated with number of applications 306.

In an illustrative example, number of applications 306 includes application 322, application 324, and application 326. Application 322 may be associated with license 328 in number of licenses 304, in this illustrative example. Application 324 may be associated with license 330 and application 326 may be associated with license 332, in this example.

Each license in number of licenses 304 may include a unique license agreement governing the use and/or distribution of the associated application. The license agreement may include a number of guidelines and restrictions for the use of the associated application. For example, license 328 associated with application 322 may include a concurrent job count restriction. License 330 associated with application 324 may include a node list restriction. In this example, application 324 may only be licensed to run on client 314 and client 316. License 332 associated with application 326 in this example may include a job count restriction. In this example, if license 332 stipulates that application 326 can only run two jobs concurrently, and client 318 and client 320 are each running a job using application 326, a user of client 314 may be unable to access and/or run application 326 at that point in time.

The illustration of license usage environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
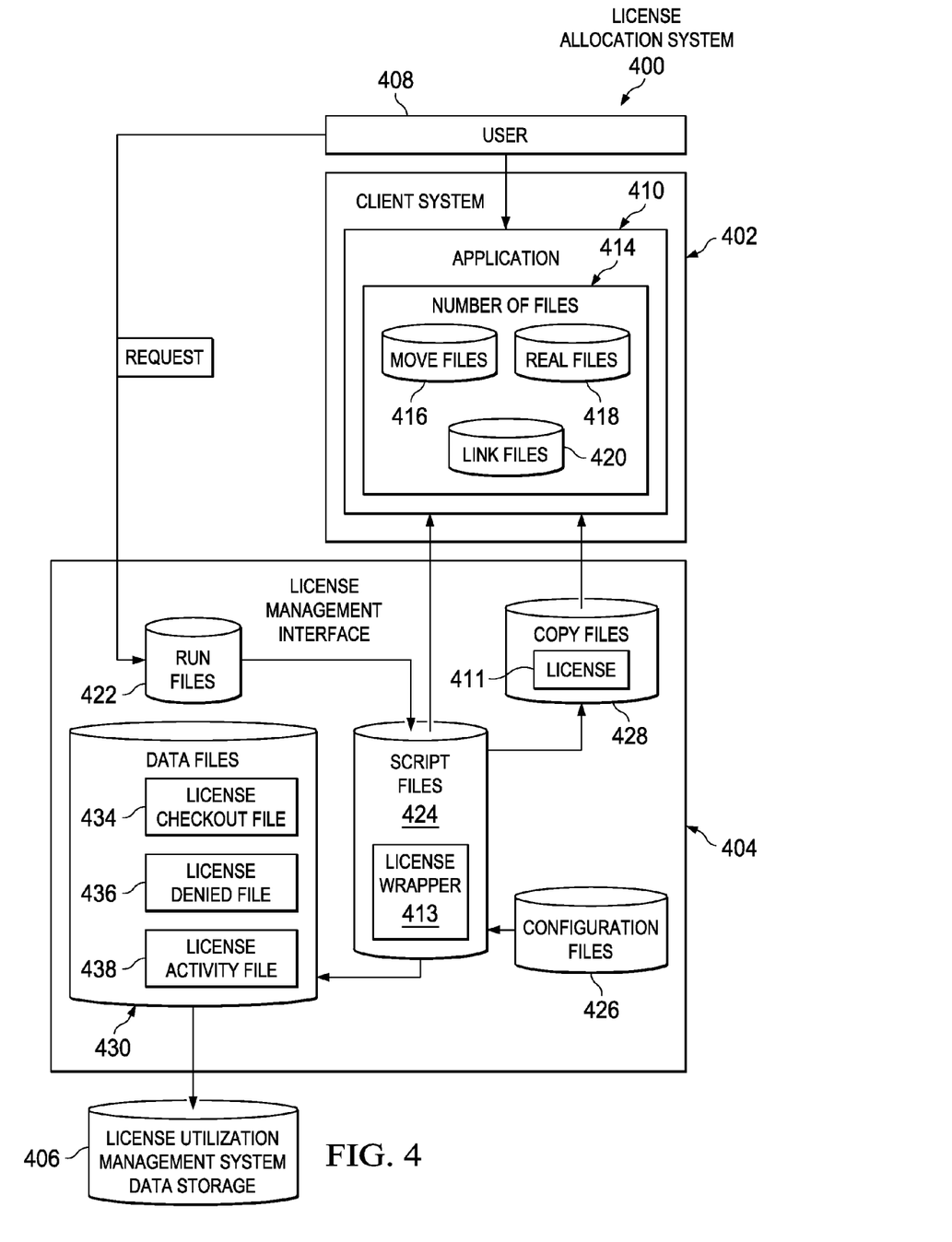
FIG. 4 is an illustration of a license allocation system in accordance with an advantageous embodiment.

With reference now to FIG. 4, an illustration of a license allocation system is depicted in accordance with an advantageous embodiment. License allocation system 400 may be implemented in license usage environment 300 in FIG. 3, for example.

License allocation system 400 includes client system 402, license management interface 404, and license utilization management system data storage 406. Client system 402 is an illustrative example of one implementation of number of client systems 302 in FIG. 3. User 408 may use client system 402 to access and/or run application 410, in this illustrative example. Application 410 is an illustrative example of number of applications 306 in FIG. 3.

Application 410 includes number of files 414. Number of files 414 are files required by application 410 in order for application 410 to run. Number of files 414 may be, for example, without limitation, executable files, license files, dynamic libraries, and/or any other suitable file required by application 410 to run.

Number of files 414 may include move files 416, real files 418, and link files 420. Move files 416 may contain required files that are temporarily moved to move files 416 for a current execution of application 410. The files in move files 416 may be moved back to an original storage location, inaccessible to user 408, once application 410 closes, for example.

Real files 418 may contain required files that are temporarily copied into real files 418 for a current execution of application 410. The files in real files 418 may be deleted once application 410 closes, for example. Link files 420 may contain temporary links to required files for a current execution of application 410. The links in link files 420 may be unlinked, or made inoperable, after application 410 closes, for example.

License management interface 404 is a license utilization management software program that controls access to applications, such as number of applications 306 in FIG. 3, based on a number of licenses managed by license allocation system 400. License management interface 404 may be located on a number of client systems or remote from client system 402, in different advantageous embodiments. License management interface 404 may be located on one or more shared storage devices accessible to a number of client systems, such as client system 402, for example.

License management interface 404 may include run files 422, script files 424, configuration files 426, copy files 428, and data files 430. Run files 422 are programs that a user executes to tell license management interface 412 to run a specific application. Script files 424 are called by run files 422. Script files 424 may include, for example, license wrapper 413 used by license management interface 404 to control access to applications associated with licenses.

License wrapper 413 is a script which provides license utilization management interface 404 the ability to control access to applications. In this illustrative example, license management interface 404 controls the access to application 410 using license wrapper 413. In an advantageous embodiment, user 408 may attempt to run application 410 by directly accessing application 410 and bypassing license management interface 404. In this example, application 410 will not start because user 408 is not using license management interface 404.

In another advantageous embodiment, user 408 may attempt to run application 410 by accessing application 410 through license management interface 404. In this example, license management interface 404 may allow access to application 410 and allocate a temporary license usage to provide user 408 access to application 410, based on the license agreement associated with application 410.

Configuration files 426 are files that define where all of the license utilization management wrap files are located within license allocation system 400, the specific limitations on license checkouts, and other initialization information for the license utilization management wrap software. Copy files 428 may be license files, application files, library files, or any other file which is required for a given application to run. In this illustrative example, copy files 428 may include license 411 associated with application 410. License 411 is an illustrative example of one implementation of number of licenses 304 in FIG. 3.

Data files 430 include information about license events. A license event may be, for example, without limitation, a license checkout, a license check-in, a license denial, and/or any other suitable event. Data files 430 includes license checkout file 434, license denied file 436, and license activity file 438. License checkout file 434 records a timestamp for each time a license is checked out. License denied file 436 records a timestamp for each time a license is denied in response to a license wrapper request. License activity file 438 records all license checkouts, check-ins, and denials in a sequential manner.

The illustration of license allocation system 400 in FIG. 4 is not meant to imply physical or architectural limitations to the manner in which different advantageous embodiments may be implemented.

Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
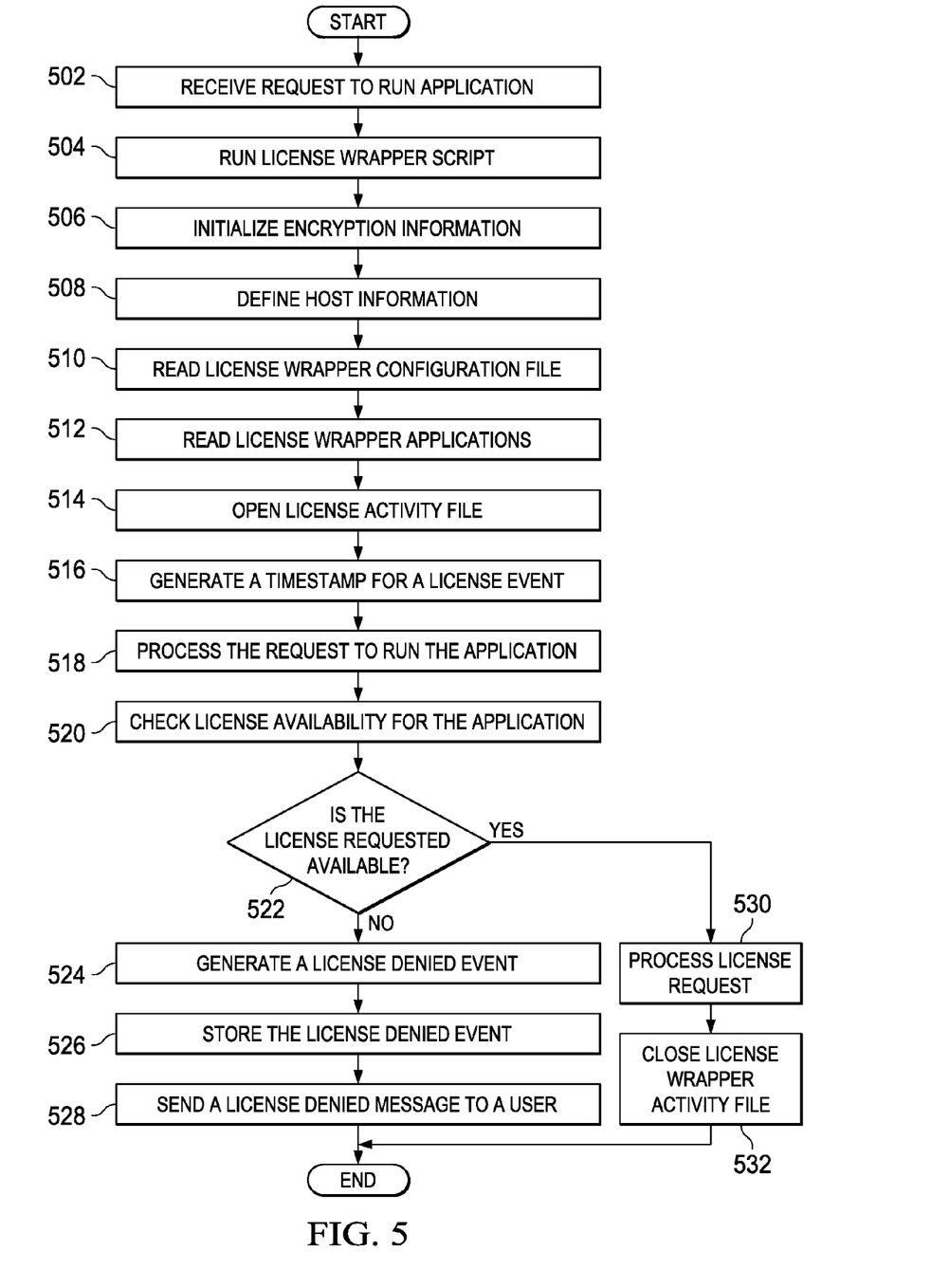
FIG. 5 is an illustration of a flowchart of a process for allocating license usage in accordance with an advantageous embodiment.

With reference now to FIG. 5, an illustration of a flowchart of a process for allocating license usage is depicted in accordance with an advantageous embodiment. The process in FIG. 5 may be implemented by a component such as license management interface 404 in FIG. 4, for example.

The process begins by receiving a request to run an application (operation 502). The request may be a request from a user, such as user 408 in FIG. 4, to run an application, such as application 410 in FIG. 4, for example.

The process runs a license wrapper script (operation 504) to prepare to process the request received. The license wrapper script may be license wrapper 413 of license management interface 404 in FIG. 4, for example. The process initializes encryption information (operation 506). Initializing the encryption information encrypts the location of the primary license utilization management system wrap configuration files. This encryption is performed so a user running an application will not be able to track down where the key application files are located, or circumvent the license management interface, such as license management interface 404 in FIG. 4.

The process defines host information (operation 508), and reads a license wrapper configuration file (operation 510). The host is the client system that is running the license wrapper script, such as license wrapper 413 in FIG. 4, or the specific commands for copying, deleting, renaming, or linking files, for example. The license wrapper configuration file defines the other license utilization management system wrap initialization files needed to run the application requested, for example.

The process then reads license wrapper applications (operation 512). Reading the license wrapper applications includes reading the application configuration for the application requested, as well as reading the application type, options, license limits, nodes, and users. The process opens a license activity file (operation 514). The license activity file may be a log file, such as license activity file 438 in FIG. 4, for example.

The process generates a timestamp for a license event (operation 516) and processes the request to run the application (operation 518). A license event may be, for example, a license checkout, a license check-in, a license denial, and/or any other suitable event. The timestamp is used to label all license events with a date and time. The process checks license availability (operation 520) for the application requested. Checking license availability includes evaluating the license agreement associated with a license for an application and determining the criteria for use, for example, as explained further in FIG. 7.

The process determines whether the license requested is available (operation 522). If a determination is made that the license requested is not available, the process generates a license denied event (operation 524). The process stores the license denied event (operation 526). The license denied event may be stored in a database or log file, such as a license denied file, for example. The process sends a license denied message to a user (operation 528) who initiated the license wrapper request, with the process terminating thereafter.

If the process determines that the license requested is available, the process processes the license request (operation 530) and closes the license wrapper activity file (operation 532), with the process terminating thereafter.

Figure 6:
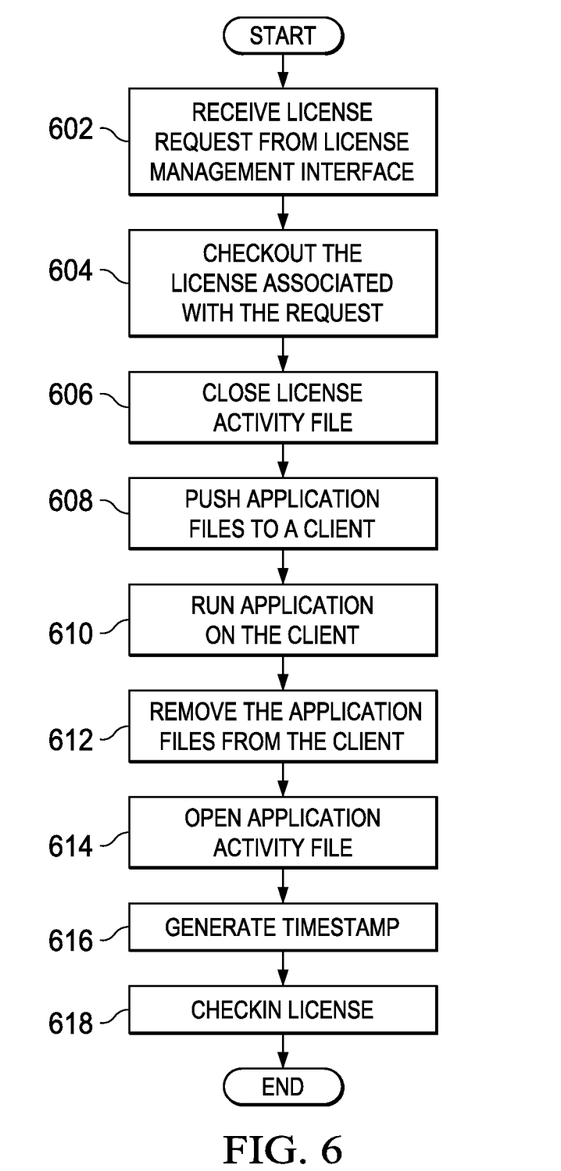
FIG. 6 is an illustration of a flowchart of a process for processing a license request in accordance with an advantageous embodiment.

With reference now to FIG. 6, an illustration of a flowchart of a process for processing a license request is depicted in accordance with an advantageous embodiment. The process in FIG. 6 may be implemented by a component such as license management interface 412 in FIG. 4, for example.

The process begins by receiving a license request from a license management interface (operation 602). The license request may be processed as in FIG. 5 up to operation 524, for example. The following steps may be performed to execute operation 524 in FIG. 5, in an advantageous embodiment.

The process checks out the license associated with the request (operation 604). Checking out the license includes decrementing the license count in data files, such as data files 430 in FIG. 4. In an illustrative example, where there are five licenses available for use, checking out a license would decrement the count to four available licenses. The process closes the license activity file (operation 606).

The process pushes application files to a client (operation 608). The application files may be files needed to run the application requested, for example. The application files may be pushed by copying the files from a source to a destination client system, or creating a destination link to the source file, for example. The process then runs the application on the client (operation 610).

The process removes the application files from the client (operation 612). Removing the application files may include deleting, renaming, and/or unlinking the application files from the client system where the application files were pushed. The process opens the application activity file (operation 614). The process then generates a timestamp (operation 616) and checks in the license (operation 618), with the process terminating thereafter. Checking in a license includes incrementing the license count of available licenses for use in data files, such as data files 430 in FIG. 4.

The license allocation system license management interface controls access to licenses. As part of that control, license wrapper 413 in FIG. 4 checks to see if a license can be checked out for use when a request is received. If the license can be checked out, license wrapper 413 records a checkout event, decreases the number of available licenses by one, and runs the application on the client system that originated the request.

When the application exits, such as when a user closes the application for example, license wrapper 413 records the check-in of the license and increases the number of available licenses by one.

Figure 7:
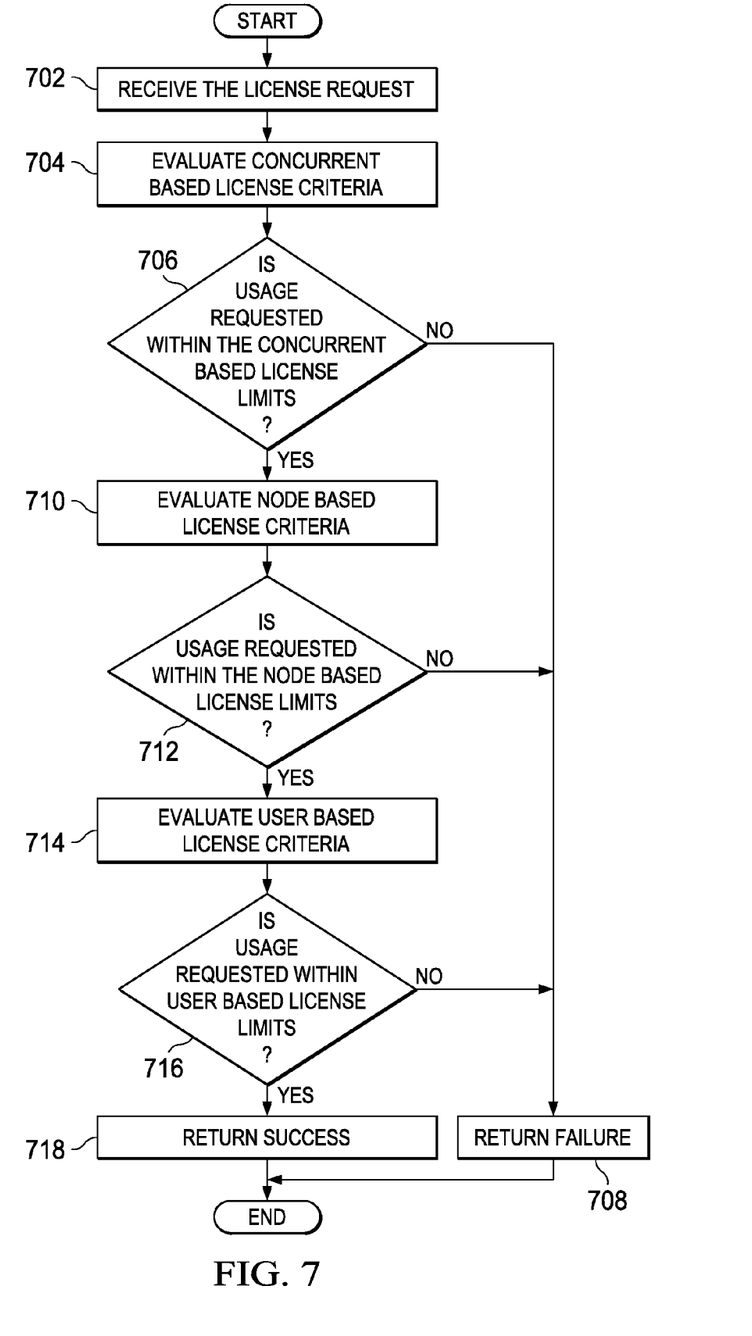
FIG. 7 is an illustration of a flowchart of a process for checking license availability in accordance with an advantageous embodiment.

With reference now to FIG. 7, an illustration of a flowchart of a process for checking license availability is depicted in accordance with an advantageous embodiment. The process in FIG. 7 may be implemented by a component such as license management interface 412 in FIG. 4, for example.

The process begins by receiving a license request (operation 702). The license request may be triggered by a user attempting to run or access an application associated with the license, for example. The process in FIG. 5 may execute up to operation 520, with the following steps used to execute operation 520 in FIG. 5.

The process evaluates concurrent based license criteria (operation 704). The process determines whether the usage requested is within the concurrent based license limits (operation 706) of the license agreement. Concurrent based use may refer to the ability to run a number of concurrent jobs using an application at any given time.

If a determination is made that the usage requested is not within the concurrent based license limits, the process returns a failure (operation 708), with the process terminating thereafter. A failure may be a license denial, for example.

If a determination is made that the usage requested is within the concurrent based license limits, the process evaluates node based license criteria (operation 710). Node based criteria may be a number of nodes on which an application may run or specific nodes on which an application and/or license may be run, for example.

The process determines whether the usage requested is within the node based license limits (operation 712). If a determination is made that the usage requested is not within the node based license limits, the process returns failure (operation 708), and terminates thereafter.

If a determination is made that the usage requested is within the node based license limits, the process evaluates user based license criteria (operation 714). User based license criteria may be a number of users that are allowed to operate an application at a given time, or specific users that are allowed to operate the subject application and/or license, for example.

The process determines whether the usage requested is within user based license limits (operation 716). If a determination is made that the usage requested is not within user based license limits, the process returns failure (operation 708), and terminates thereafter.

If a determination is made that the usage requested is within user based license limits, the process returns success (operation 718), and terminates thereafter.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current software license are costly and often limit the number of licenses a company or business can afford to buy for a particular application. Additionally, the cost of the licenses is often inequitably spread across multiple business units that use the licenses with varying degrees of frequency. Current systems to track license usage are limited to specific platforms and specific types of licenses, and do not provide any way to track the usage particular to a business unit or project code for any type of license being used within a given company.

The different advantageous embodiments further recognize and take into account that a given license will have a license agreement stipulating the terms of use in one or more areas, such as the number of systems that can use the license at a given time, the number of users that can use the license at a given time, or the number of jobs that can run using the license at a given time. With varying agreements for each license, often a larger number of licenses than needed is purchased in order to cover the different user groups or systems that may need access to the license at different times.

Therefore, the different advantageous embodiments provide a system and method that track various uses of licenses according to the license agreements stipulations and allocate licenses accordingly to maximize efficiency of fewer licenses. This system allows one to pool node based, user based, and honor based software licenses into a single pool of licenses and these licenses are then managed by a checkin/checkout license management process, which enforces vendor software license agreements, controls access to the applications associated with the licenses, and provides license utilization and denial metrics for efficient management of software licenses.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for managing license usage, the system comprising: a license management interface configured to control access to a number of software applications, wherein the number of software applications to be accessed are associated with a number of licenses; and a number of storage devices having a number of files needed to run the number of software applications and configured to be managed by the license management interface to distribute the number of files to a number of client systems approved to run the number of software applications, wherein the number of files includes a configuration file for a requested application that defines where files are located within the system, and wherein the license management interface is further configured to initialize encryption information, which includes encrypting a location of the configuration file, and further configured to define host information, read license wrapper applications, generate a timestamp, and process the request to run the application.

2. The system of claim 1, wherein the number of files include at least one of run files, script files, configuration files, data files, and copy files.

3. The system of claim 1 further comprising:
a license utilization management system data storage device.

4. The system of claim 1, wherein the number of licenses include a number of usage criteria, and wherein the number of usage criteria include at least one of node based license limits, user based license limits, concurrent usage based license limits, and job count based license limits.

5. A method for allocating license usage, the method comprising:
receiving, at a license management interface executed by a processor, a request to run a software application from a client;
running, by the license management interface, a license wrapper script in response to the request received from the client;
opening, by the license management interface, a license wrapper activity file for the software application;
defining, by a configuration file for the software application, where files are located, forming a location definition;
initializing, by the license management interface, encryption information, including encrypting the location definition in the configuration file for the software application;
defining host information;
reading license wrapper applications;
generating, by the license management interface, a timestamp; and
processing, by the license management interface, the request to run the application.

6. The method of claim 5 further comprising:
checking license availability;
determining whether the license requested is available, forming a license availability; and
responsive to a determination that the license requested is available, processing the license wrapper request.

7. The method of claim 5, wherein the license wrapper applications define initialization files needed to run the software application.

8. The method of claim 6, wherein checking the license availability further comprises:
evaluating concurrent based criteria;
evaluating node based license criteria; and
evaluating user based license criteria.

9. The method of claim 8, wherein evaluating concurrent based criteria further comprises:
determining whether a usage requested is within concurrent based license limits; and
responsive to a determination that the usage requested is within the concurrent based license limits, returning success.

10. The method of claim 9 further comprising:
responsive to a determination that the usage requested is not within the concurrent based license limits, returning failure.

11. The method of claim 8, wherein evaluating node based criteria further comprises:
determining whether a usage requested is within node based license limits; and
responsive to a determination that the usage requested is within the node based license limits, returning success.

12. The method of claim 11 further comprising:
responsive to a determination that the usage requested is not within the node based license limits, returning failure.

13. The method of claim 8, wherein evaluating user based criteria further comprises:
determining whether a usage requested is within user based license limits; and
responsive to a determination that the usage requested is within the user based license limits, returning success.

14. The method of claim 13 further comprising:
responsive to a determination that the usage requested is not within the user based license limits, returning failure.

\* \* \* \* \*